United States Patent [19]

Peel

[11] 4,006,712
[45] Feb. 8, 1977

[54] MILKING APPARATUS

[75] Inventor: John Forth Peel, Kellyville, Australia

[73] Assignee: Nealeforth Farms Pty. Limited, Canberra City, Australia

[22] Filed: Nov. 12, 1975

[21] Appl. No.: 631,089

[30] Foreign Application Priority Data

Nov. 18, 1974 Australia .......................... 9656/74

[52] U.S. Cl. ............................................ 119/14.03
[51] Int. Cl.² ........................................ A01K 1/00
[58] Field of Search ............. 119/14.03, 14.04, 16, 119/27, 103

[56] References Cited

UNITED STATES PATENTS

| | | | |
|---|---|---|---|
| 2,472,122 | 6/1949 | Polivka | 119/14.03 X |
| 2,740,377 | 4/1956 | Duncan | 119/14.03 |
| 3,283,744 | 11/1966 | Conover | 119/16 |

Primary Examiner—Hugh R. Chamblee
Attorney, Agent, or Firm—Stevens, Davis, Miller & Mosher

[57] ABSTRACT

Milking apparatus for dairies in which cows are supported during milking on vertically movable platforms, the entry area to these platforms being elevated relative to the area of exit from the platforms, the difference in height between these levels enabling an operator to work at the exit side of the milking positions and to avoid bending when preparing the cows for milking.

7 Claims, 4 Drawing Figures

MILKING APPARATUS

BACKGROUND OF THE INVENTION

This invention relates to milking apparatus, and has as its object the provision of such apparatus which enables milking of cows to be carried out with greater simplicity and ease of operation than is obtained in the prior art.

It is known to be desirable in the design of dairy apparatus, to provide an arrangement whereby the operator is able to work from a level somewhat below the level of the cows during milking. In this way, the operator is able to attend to the attachment of the teat cup cluster without bending, thereby reducing operator fatigue and increasing the efficiency of the operator. Various means have been proposed in the past to enable this to be achieved, but these known arrangements suffer from various disadvantages. For example, the known "herringbone" arrangement requires that cows be milked in batches of, for example, five, and this makes it impossible to achieve a continuous and orderly flow of cows through the dairy, and also requires active supervision of the cows awaiting milking. Another type of apparatus known employs a rotary milking system, but this requires that the cows enter in single file and has the additional disadvantage of upsetting the cows prior to milking, due to the rotation of the equipment.

SUMMARY OF THE INVENTION

The present invention seeks to provide dairy apparatus in which the operator is able to work at a level below that of the cow during milking, and at the cow exit side of the milking apparatus. The invention also seeks to provide such apparatus which does not require any batching or other close supervision of the cows awaiting milking, so that the cows may simply be gathered at the entry region of the dairy, and allowed to move into the milking bails as they become vacant.

In one broad aspect, the present invention comprises a plurality of milking stations located between a cow entry area and a cow exit area, the entry area being elevated relatively to the exit area, each milking station comprising a cow supporting surface capable of movement between a milking position substantially at the level of said entry area and an exit position substantially at the level of said exit area.

In its preferred embodiments as described herein, the invention enables the milking of up to 20 cows or more at a time by a single operator, with the only manual operation required to be carried out during the continuous milking of a herd, being the washing of the udders and the attachment of the milking cups.

DETAILED DESCRIPTION OF EMBODIMENTS OF THE INVENTION

To facilitate the description of the present invention, the accompanying drawings show relevant portions of a dairy incorporating the apparatus of the present invention.

Figure 1:
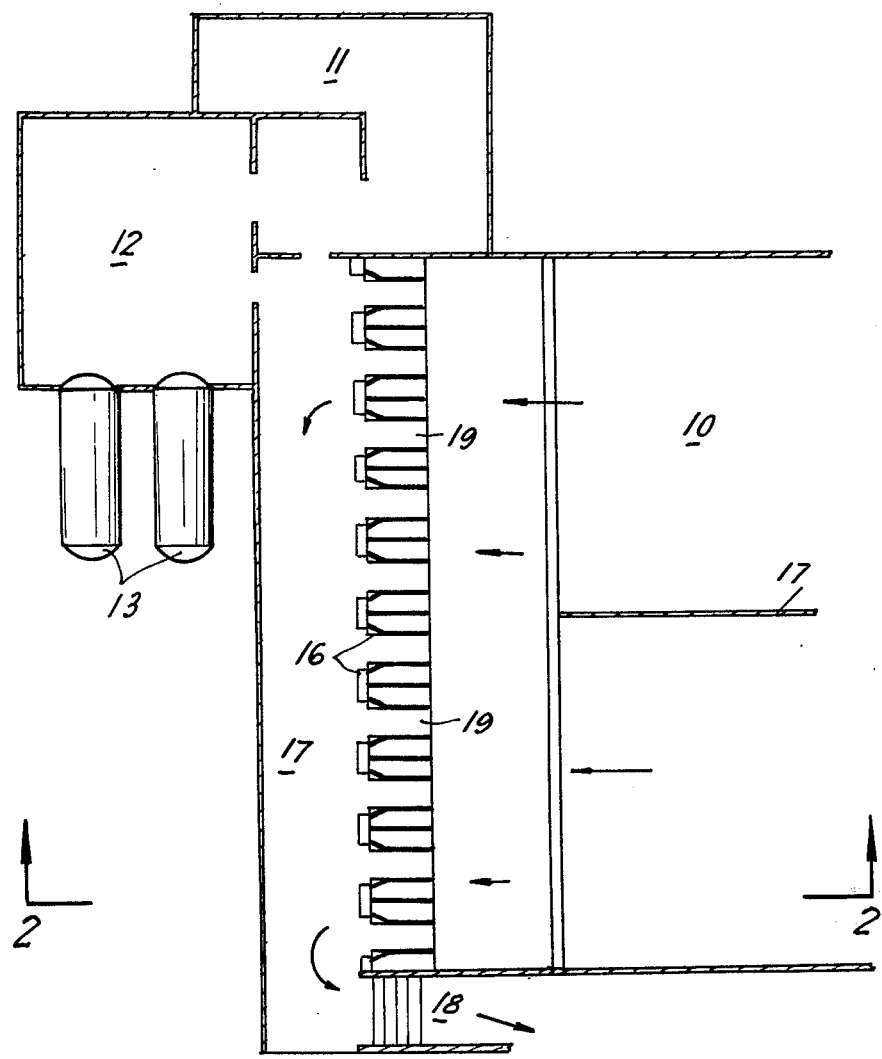
FIG. 1 shows in plan view a plurality of milking stations with their associated entry and exit areas.
Figure 2:
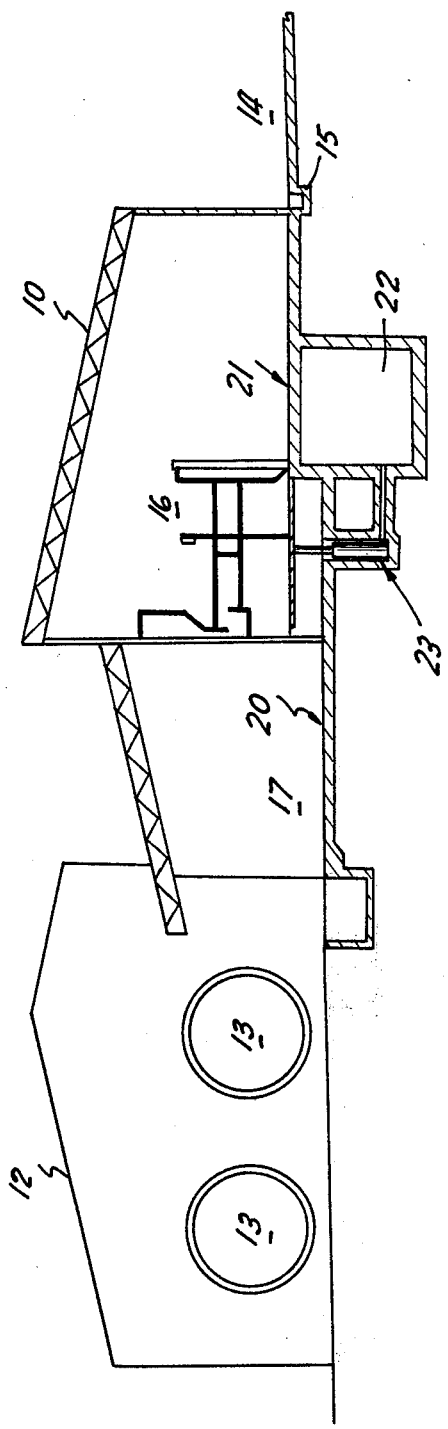
FIG. 2 shows a cross-sectional elevation taken on line 2—2 of FIG. 1.

Referring firstly to FIGS. 1 and 2, the relevant part of the dairy generally comprises a milking shed 10, plant room 11 and milk room 12, the latter being provided with a pair of milk storage tanks 13. Located outside and continuing into the milking shed 10 is a cow marshalling or entry area 14 which, like the remainder of the areas, illustrated, is provided with a washable concrete floor including a drain 15. The entry area 14 is provided with side fences 16 and a center dividing fence 17, and is preferably provided with movable gates (now shown) which may be moved towards the milking area during a milking operation, as is well known in the prior art.

Located within the milking shed 10 at the end of the marshalling area 14 is a row of milking stations 16, which will be described in more detail below.

Beyond the milking stations 16 is an open area exit 17 through which cows pass to the exit 18, and in which the operator or operators move during milking operations. Operator spaces 19 are provided between each pair of milking stations.

It will be noted that the floor 20 of the cow exit region 17 is located at a level below that of the floor 21 of the cow entry region 14. The differences in these levels is chosen to suit the operators, and it has been found that a difference of approximately 760 mm is appropriate to avoid the need for the operator to bend while washing the udder and attaching the teat cups.

Located below the floor 21 is an equipment tunnel 22 which carries, inter alia, the hydraulic equipment (not shown) for operating hydraulic rams 23 associated with each milking station, again described in more detail below.

Figure 3:
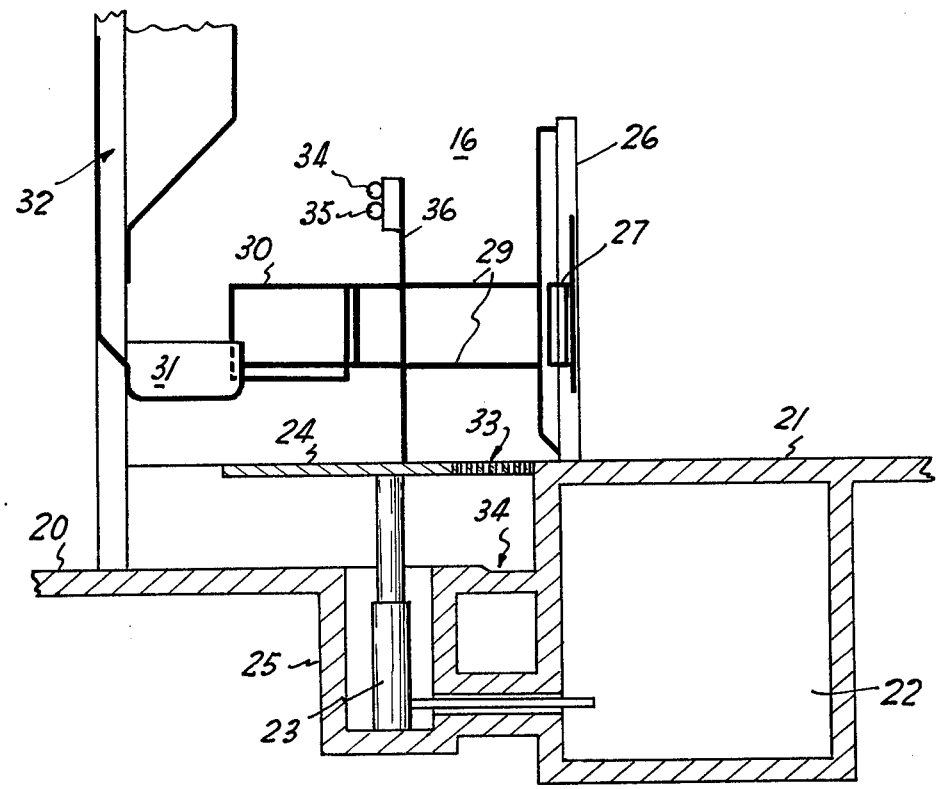
FIG. 3 shows a cross-sectional elevation of a typical milking station taken on line 3—3 of FIG. 4.
Figure 4:
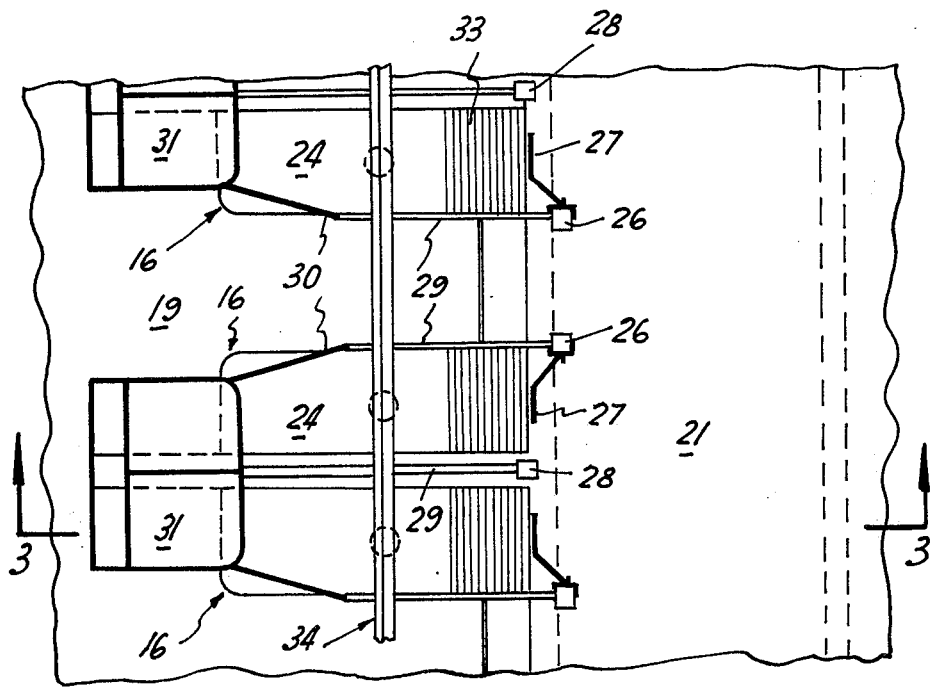
FIG. 4 shows a plan view of a typical milking station.

Referring now to FIGS. 3 and 4, each milking station 16 will be seen to comprise a vertically movable cow supporting platform 24, which under the control of a hydraulic ram 23, mounted in a well 25, is movable between a milking position (as shown in FIG. 3) where the platform 24 is at the same level as the adjacent floor 21 of the entry area, and an exit position closely adjacent the floor 20 of the exit area 17. Mounted on vertical posts 26, which also serve as roof supporting columns, are vertically movable entry gates 27, one entry gate being associated with each milking station 16. These gates are moved by means of pneumatic or hydraulic devices well known in the art and therefore not illustrated here. Also mounted on the posts 26, and on center posts 28, are side rails 29 serving to enclose the sides of each milking station.

At the outer end of the side rails 29 adjacent the operator space 19, there are provided swinging exit gates 30, which allow the cow to leave the platform 24 when it has descended to its exit position.

Associated with each milking station 16 is a feed trough 31 provided with an individual feed chute 32, by which cows may be provided with metered feed while milking. The feed quantity, as is known, may be adjusted to suit the particular cow milking at a particular time.

Each platform 24 is provided at its end adjacent the entry gate 27, with a grid 33, which allows droppings to pass to the floor 20, at the inner end of which is provided a drain 34.

Operation of the hydraulic ram 18 is preferably by means of compressed air providing appropriate pressure to an oil system, and the necessary compressor, air reservoir and other apparatus is located within the tunnel 22. If desired, a single air reservoir could supply the complete row of milking stations, but in the presently proposed embodiment a separate reservoir is provided for each milking station. It will be appreciated that since in the operation of the apparatus, energy is obtained from the lowering of a cow at the end of each milking operation, a surplus of energy will be obtained in the compressed air reservoirs, and while this may simply be bled to the atmosphere, it will be clear that this energy could be used for other purposes in the dairy, for example, to provide compressed air for the operation of other equipment, such as the gates referred to above.

A conventional air line 34 and milk line 35 are provided, running above the milking stations 16, and supported at intervals by posts 36. In conventional manner, drop lines and teat clusters of known type (not shown) are provided at each milking station 16.

The gates 27 and 30, the cow supporting platform 24, and the milking equipment itself, are operated in conjunction by means of electrically controlled pneumatic equipment which is not shown, being of conventional construction.

Preferably, the milking operations are controlled by the automatic milking control equipment of the type described in U.S. Pat. No. 3,878,819 to Harman, which should be read herewith. The sequence of operations of the equipment illustrated will be described below on the assumption that such equipment is used, although it will be appreciated that the use of this degree of automation is not essential to the present invention.

In the operation of a dairy incorporating the equipment described, cows are assembled in the entry area, from where they move into vacant milking stations of their own accord, attracted if necessary by feed provided in the troughs 31. As a cow enters a given milking station and moves onto the platform 24, a sensing device (not shown) such as an ultrasonic beam is tripped to close the entry gate 27. The operator, moving in the exit area 17 and the operator areas 19, washes the udder and attaches the teat cup cluster, whereupon the milking of the cow commences. As mentioned above, this milking is preferably controlled automatically by the apparatus described in our co-pending application referred to above.

At the cessation of milking of a particular cow, the vacuum is cut off, the teat cup cluster is drawn up by conventional pneumatic means, and the platform 24 commences its descent upon a reduction of the pressure applied to the ram 23. This pressure is reduced only to an extent sufficient for the weight of the cow to cause the platform to descend. When the platform 24 reaches the floor 20, a proximity switch (not shown) operates to open the exit gate 30. The cow will then step off the platform and move into the exit area 17. With the removal of the cow's weight from the platform 24, the latter will rise again to its uppermost position under the action of the ram 23. As the platform commences to rise, the proximity switch already referred to is actuated again, this time to close the exit gate 30.

When the platform 24 reaches its uppermost position, a further proximity switch (also not shown) operates to cause increased pressure to be applied to the ram 23, and the platform 24 locks in position. Simultaneously the entry gate 27 is opened.

The switches and associated circuitry for controlling the operation of the platform 24 and the gates 27 and 30 is not shown, being of conventional design well known in the operation of for example, industrial lift cages.

It will be thus seen that the operator has no need to move amongst cows waiting to be milked, but operates instead on the exit side of the equipment where the likelihood of the operator being obstructed by cows is very much less. The cows encounter no disturbances in moving to a milking position, and the flow of cows through the dairy is simple and efficient.

It will be appreciated that the equipment described is capable of many modifications within the scope of the present invention. For example, the downward movement of the platform 17 upon the end of a milking operation, may be employed to remove the teat cups from the cow, by suspending the cluster at a fixed height and employing a vacuum control valve which is automatically shut off as the platform begins to descend.

It will also be noted that the descent of the milking platform at the end of milking automatically removes access of the cow to the feeding trough 20, so that the need for any special means of doing this is avoided. The simplification of the milking apparatus thus obtained represents a further advantage of the present invention.

The apparatus described offers a convenient means by which the weight of a cow may be measured. By measuring with a pressure indicating means (not shown) the increase in pressure which occurs in the hydraulic system when a cow enters the milking station (the platform 24 being supported in its milking position by a hydraulic lock-off valve), the weight of the cow can be readily determined. By appropriate measuring devices the weight may alternatively be measured during the descent of the platform 24.

The claims defining the invention are as follows:

1. Milking apparatus comprising a plurality of milking stations located between a cow entry area and a cow exit area, the entry area being elevated relatively to the exit area, each milking station comprising a vertically moveable cow supporting platform capable of movement between a milking position substantially at the level of said entry area and an exit position substantially at the level of said exit area, said platform being hydraulically operated with sufficient lifting pressure being applied to said platform during lowering thereof to the exit position as to enable the platform automatically to rise to its milking position upon the cow stepping off the platform at its exit position.

2. Milking apparatus as defined in claim 1, wherein said milking stations are arranged in pairs, the stations of each pair being closely adjacent, each pair being separated from the next by an operator space.

3. Milking apparatus as defined in claim 1, wherein said cow supporting platform is generally rectangular, said apparatus further comprising an entry gate located adjacent on end of said platform, a feed dispenser located adjacent the other end of said platform, and an exit gate located adjacent one side of said platform to allow exit of a cow from said platform when the latter is in its exit position, into an operator space located beside said milking station.

4. Milking apparatus as defined in claim 1, wherein said cow supporting surfaces are lowered by employing the weight of a cow supported thereon, the energy derived from such lowering being utilized in equipment associated with said milking apparatus.

5. Milking apparatus as defined in claim 1 further comprising means measuring the increase in pressure in the hydraulic operating system due to the presence of a cow on the platform thereby to provide an indication of the weight of the cow.

6. Milking apparatus as defined in claim 1, wherein each milking station includes an entry gate and an exit gate, said entry gate being operable only when said cow supporting surface is in its milking position, said exit gate being operable only when said cow supporting surface is in its exit position.

7. Milking apparatus as defined in claim 5 further comprising means sensing the position of said cow supporting surface, means responsive to said sensing means operating to open said entry gate upon said surface rising to said milking position, and operating to open said exit gate upon said surface descending to said exit position.

* * * * *